United States Patent [19]
Bollard

[11] 3,761,925
[45] Sept. 25, 1973

[54] DOPPLER SPEED METER
[75] Inventor: David Rooksby Bollard, North Fambridge, England
[73] Assignee: Pye Limited, Cambridge, England
[22] Filed: Sept. 29, 1970
[21] Appl. No.: 76,367

[30] Foreign Application Priority Data
Oct. 9, 1969 Great Britain............... 49,615/69
Feb. 10, 1970 Great Britain................. 6,415/70

[52] U.S. Cl. ................................ 343/8, 343/9
[51] Int. Cl. ........................................... G01s 9/46
[58] Field of Search........................ 343/8, 7 A, 9

[56] References Cited
UNITED STATES PATENTS
3,377,587 4/1968 Nakahara et al. ............. 343/8
3,189,896 6/1965 Schmidt et al. .............. 343/7 A
3,512,155 5/1970 Bloice ........................... 343/8
3,432,237 3/1969 Flower et al. .................. 343/8
3,505,637 4/1970 Abruzzo ....................... 343/7 A
3,618,084 11/1971 Balsiger ........................ 343/8
3,257,505 6/1966 Van Wechel .................. 343/7 A Primary Examiner—Benjamin A. Borchelt
Assistant Examiner—G. E. Montone
Attorney—Beveridge & De Grandi

[57] ABSTRACT

Radar apparatus for measuring a Doppler shift between the frequencies of a transmitted radar signal and a reflected radar signal comprises means to provide a difference signal having a frequency equal to that of the Doppler shift, means to select those cycles of the difference signal that have an amplitude above a predetermined limit and a period within predetermined limits of a mean period derived from the periods of previously selected cycles, means to provide pulsiform signals, each pulsiform signal corresponding to a respective selected cycle and having an algebraic sign dependent on the period of said respective cycle compared to said mean period, and means to integrate the pulsiform signals whereby to provide an output indicative of the Doppler shift.

22 Claims, 6 Drawing Figures

Inventor
DAVID ROOKSBY BOLLARD
By Beveridge + DeGrandi
Attorneys

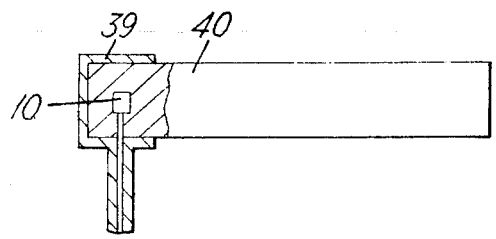
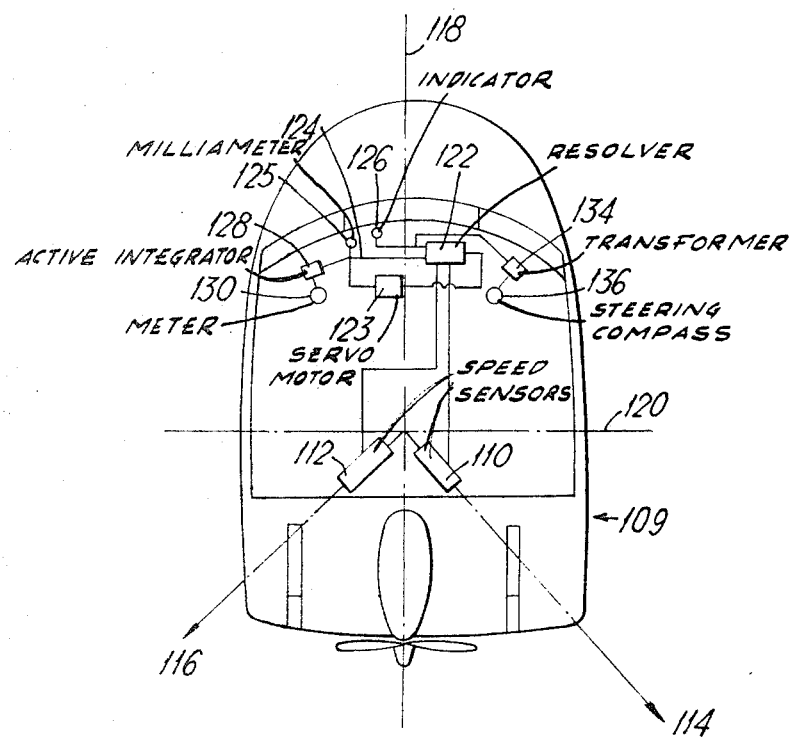

Patented Sept. 25, 1973

Inventor:

DAVID ROOKSBY BOLLARD

By
Beveridge + DeGrandi,
Attorneys

DOPPLER SPEED METER

This invention relates to radar apparatus adapted to measure a Doppler shift between the frequencies of a transmitted radar signal and a reflected radar signal.

In one aspect, the invention provides radar apparatus for measuring a Doppler shift between the frequencies of a transmitted radar signal and a reflected radar signal, comprising means to provide a difference signal, means to select those cycles of the difference signal that have an amplitude above a predetermined limit and a period within predetermined limits of a mean period derived from the periods of previously selected cycles, means to provide pulsiform signals, each pulsiform signal corresponding to a respective selected cycle and having an algebraic sign dependent on the period of said respective cycle compared to said mean period, and means to integrate the pulsiform signals whereby to provide a signal proportional to the Doppler shift. The term "pulsiform signal" as used herein means a signal consisting of a train of individual pulses.

The means to select may comprise a trigger operative each time the amplitude of the difference signal passes in a predetermined direction through a predetermined value to provide a train of trigger pulses, a said trigger pulse initiating a ramp signal, means respectively to sense when the ramp signal reaches first, second and third values, gating means to receive signals from the sensing means, and to receive the trigger pulses, the gating means being adapted to produce a said pulsiform signal of one algebraic sign if the trigger pulse occurs whilst the ramp signal is between its first and second values, the gating means being adapted to produce a pulsiform signal of the other algebraic sign if the said immediately following trigger pulse occurs whilst the ramp signal is between its second and third values.

The integrating means may be arranged to adjust a stored quantity, indicative of the Doppler shift and being the integral of previously occurring pulsiform signals, according to the algebraic sign of each pulsiform signal, a feedback loop being arranged to control the rate of change with time of the ramp signal as a function of said stored quantity.

The sensing means may be adapted to operate when the ramp signal reaches its third value to terminate said ramp signal and to reset a logic gate to a predetermined state, the logic gate being arranged to change state in response to a subsequently occuring trigger pulse to re-initiate said ramp signal.

There may be a microwave semiconductive device arranged to operate as an oscillator to provide the transmitted radar signal, and as a mixer to mix the transmitted radar signal and the reflected radar signal, whereby to develop the difference signal.

The device may be a Gunn effect device in a cavity resonator, a voltage stabilizing circuit being arranged to drive the Gunn effect device.

The voltage stabilizing circuit may include a Zener diode for providing a reference voltage, means for comparing the drive voltage applied to the Gunn effect device with the reference voltage and means for stabilizing the drive voltage according to said comparison.

The means for stabilizing and comparing the drive voltage may comprise a transistor having its emitter-collector path in series with the Zener diode across the Gunn effect device, the base of the transistor being biassed by a potential divider also connected across the Gunn effect device.

Alternatively, the means for stabilizing and comparing may comprise a transistor pair adapted to compare the said drive voltage with the reference voltage and to control the drive voltage via a further transistor.

There may be means to utilize the integrator output as an indication of speed, or to derive from said output an indication of a speed- and time-related quantity.

There may be an active integrator to integrate the integrator output to provide an indication of distance.

There may be provided an active integrator to integrate said indication of speed to provide an indication of distance.

In a further aspect, the invention provides a measuring system comprising two radar apparatuses as set forth above, fixed relative to each other, one being arranged to sense speed and/or a said speed and time related quantity in one direction and the other being arranged to sense speed and/or a said speed and time related quantity in a direction orthogonal to the said one direction.

There may be means to compute from the indications provided by each said apparatus the magnitude and direction of a velocity or a velocity and time-related vector whose components are the said indications.

There may be provided a resolver having orthogonal axes of resolution, means to apply respective AC signals of the same phase and frequency to each of the two stator coils of the resolver, each AC signal being derived from a respective said indication of speed, means to rotate the rotor of the resolver and to utilise the angular position as an indication of the direction of the said velocity or vector when the resolved output on one axis of resolution is zero, and means to utilise the resolved output on the other axis of resolution as an indication of the magnitude of the said velocity or vector in said direction.

The invention also provides in another aspect, a distance measuring system comprising a velocity measuring system as set forth above, an active integrator being arranged to integrate the said indication of the magnitude of the said velocity to provide an indication of distance.

There may be means prefereably including a synchro-transmitter-transformer to utilise the said angular position of the rotor to correct a steering compass.

The velocity distance measuring system may be disposed in an air cushion vehicle, the said directions being in the yaw plane of the vehicle.

The system may be disposed in a road vehicle for measuring at least the lateral component of velocity thereof.

The invention will be described, merely by way of example, with reference to the accompanying drawings, wherein:

FIG. 2 shows an antenna forming part of the apparatus of FIG. 1;

FIG. 5 shows a velocity measuring system disposed in an air cushion vehicle, which is shown in plan, which embodies radar equipment as shown in FIG. 1 or 4.

Figure 1:
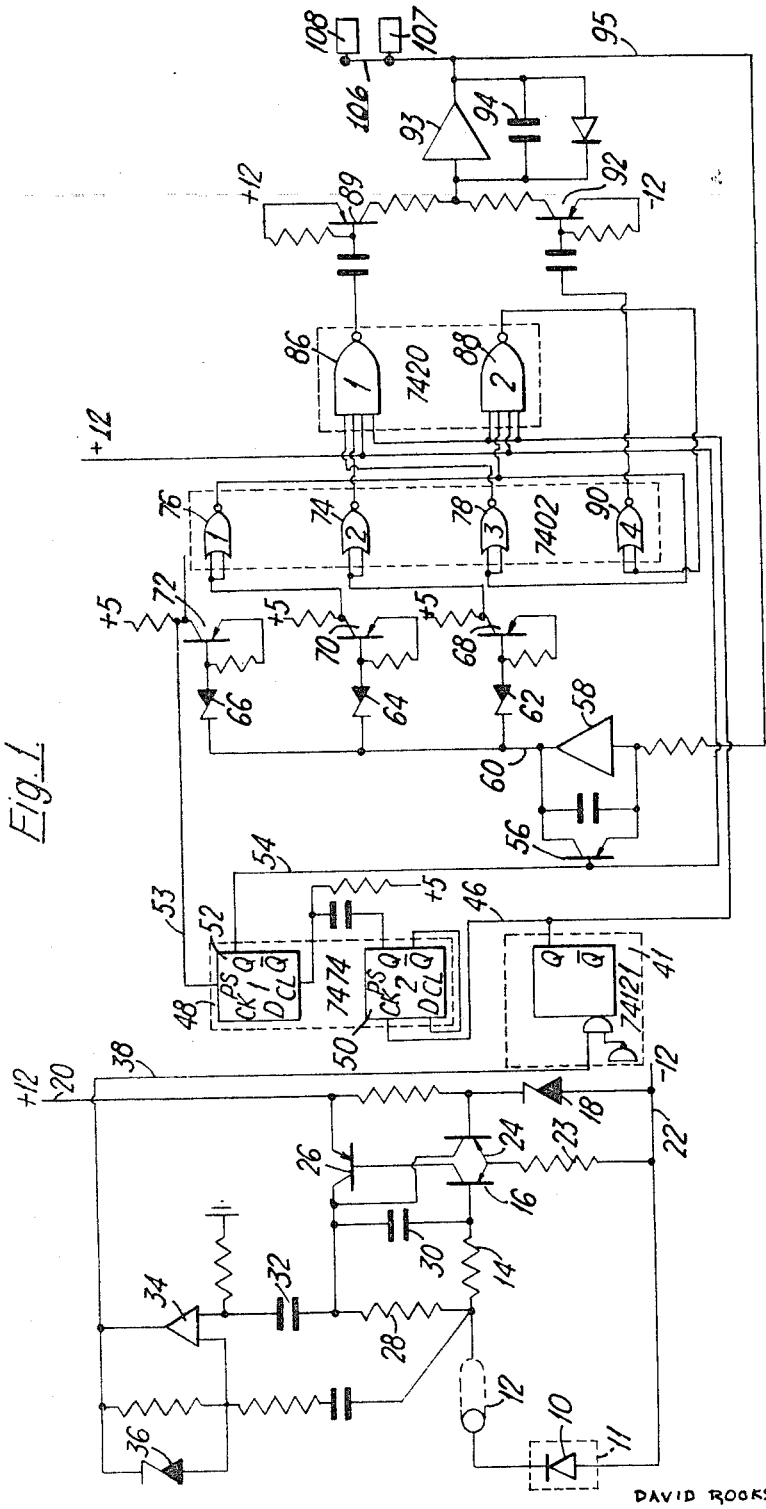
FIG. 1 shows in block diagrammatic form a speed sensor including radar equipment according to the invention.

Referring to FIG. 1, radar equipment comprises a Gunn effect device, in this case a Gunn diode 10, in a resonant cavity 11. The Gunn diode has its output directly connected to a transmit/receive antenna 12 described hereafter in greater detail with reference to FIG. 2, the Gunn diode being arranged in a stabilised loop so that in operation it is subjected to a stabilised voltage by a stabilised voltage source. By way of information but not limitation, a Gunn diode may consist basically of a short (for example not more than about 0.005 inches long) specimen of N-type gallium arsenide which produces, when subjected by means of a voltage to an electric field above a critical value of about 3,000 volts per centimetre, a current oscillating at a microwave frequency for example in the range of approximately 500 MHZ to 7,000 MHZ. This property (the Gunn effect) is due to electrons under the influence of sufficiently high fields being transferred from high to low mobility valleys in the conduction band of the gallium arsenide specimen.

A resistor 14 is provided on the "receive" side of the antenna 12, a transistor 16 having its base-emitter path in series therewith. A voltage is developed across a Zener diode 18 from a 24 volt supply on lines 20, 22. The emitter of the transistor 16 and the emitter of another transistor 24 are equally biassed from the negative rail 22 via a resistor 23. The transistors 16, 24 together constitute a transistor pair. The collectors of the transistors 16, 24 are respectively connected to the base and collector of a further transistor 26, whose emitter is connected directly to the positive rail 20. The collector of the transistor 26 is connected to a point between the resistor 14 and the antenna 12 via a series load resistor 28. The capacitor 30 joins the other end of the resistor 14 to the collector of the transistor 26, the capacitor 30 and resistor 14 acting as an A.C. filter.

This stabilized loop circuit provides a stabilized drive voltage of seven volts across the Gunn diode 10, regardless of the voltage drop in the series load resistor 28. The Zener diode 18 provides a reference voltage and a comparison between this reference voltage and the drive voltage across the Gunn diode 10 is made by the long-tailed pair 16, 24. The transistor 26 is controlled by the long-tailed pair 16,24 according to said comparison to control the voltage across the Gunn diode 10, constant collector impedances being employed to provide satisfactory line isolation.

In operation, the microwave frequency energy developed by the Gunn diode is fed to the antenna 12 resulting in radar signals of a given frequency being transmitted. If the radar signals are reflected by an object moving relative to the antenna 12, then reflected radar signals are received, having a frequency difference compared to the transmitted signals. The Gunn diode then acts effectively as a mixer, and produces across the output load resistor 28 a difference signal. The difference signal is fed via a D.C. blocking capacitor 32 to an amplifier 34, which may be of the type 709 sold by the Texas Instrument Company. A Zener diode 36 is employed in a feedback loop of the amplifier 34 as a limiter. It has been found that it is not necessary to employ automatic gain control for the amplifier 34, provided it is not overloaded. However, automatic gain control can be provided if desired in which case a time constant of between 50 and 100 milliseconds appears satisfactory. The amplifier 34 provides an amplified difference signal on the line 38, having a frequency equal to the difference in frequencies between the transmitted and received signals.

Referring to FIG. 2, there is shown an antenna of the dielectric rod type, which is particularly suitable when the equipment is used as a speed sensor in an air cushion vehicle. A resonant cavity 39 having a resonant frequency approximately equal to the transmitted and received frequencies has disposed therein the Gunn diode 10. A rod 40 of a dielectric such as for example polystyrene forms the antenna, being directly coupled to the cavity resonator with the Gunn diode embedded therein. A coaxial line or waveguide connects the Gunn diode to the circuitry of FIG. 1, the output load resistor 28 being chosen to match the impedance of the line.

The length of the rod 40 is approximately one wave length of the transmitted and received signals. Details of the theory and construction of known dielectric rod aerials can be found in the Proceedings of the Institution of Electrical Engineers, Volume 3A, 1947, in a paper by Halliday and Keily. An advantage of a dielectric rod aerial is that its mechanical strength and rigidity may be such as to avoid to a great extent the production of standing vibrational waves in the structure, due to the extreme vibration levels in an air cushion vehicle, which standing vibrational waves may well have a frequency similar to the difference frequency between the transmitted and received radar signal. Such standing vibration waves thus would give rise to spurious difference signals.

Particularly when the radar equipment is employed to measure the speed or velocity of an air cushion vehicle, the difference signal may have considerable long and short term amplitude and phase variations, due to the irregular nature of the surface of the sea, or other terrain over which the air cushion vehicle passes, and from which the radar signals are reflected. A simple frequency measuring device, to measure the frequency of the difference signal, would thus be liable to produce a misleading indication of speed or velocity.

Therefore, means are provided to select those cycles of the difference signal that have an amplitude above a predetermined value and a period within predetermined limits, set with reference to the mean period of previously-selected cycles, and means to integrate pulsiform signals, each pulsiform signal corresponding to a respective selected cycle, and having an algebraic sign dependent on the period of the respective cycle compared to the mean period derived from the periods of previously selected cycles.

Figure 3:
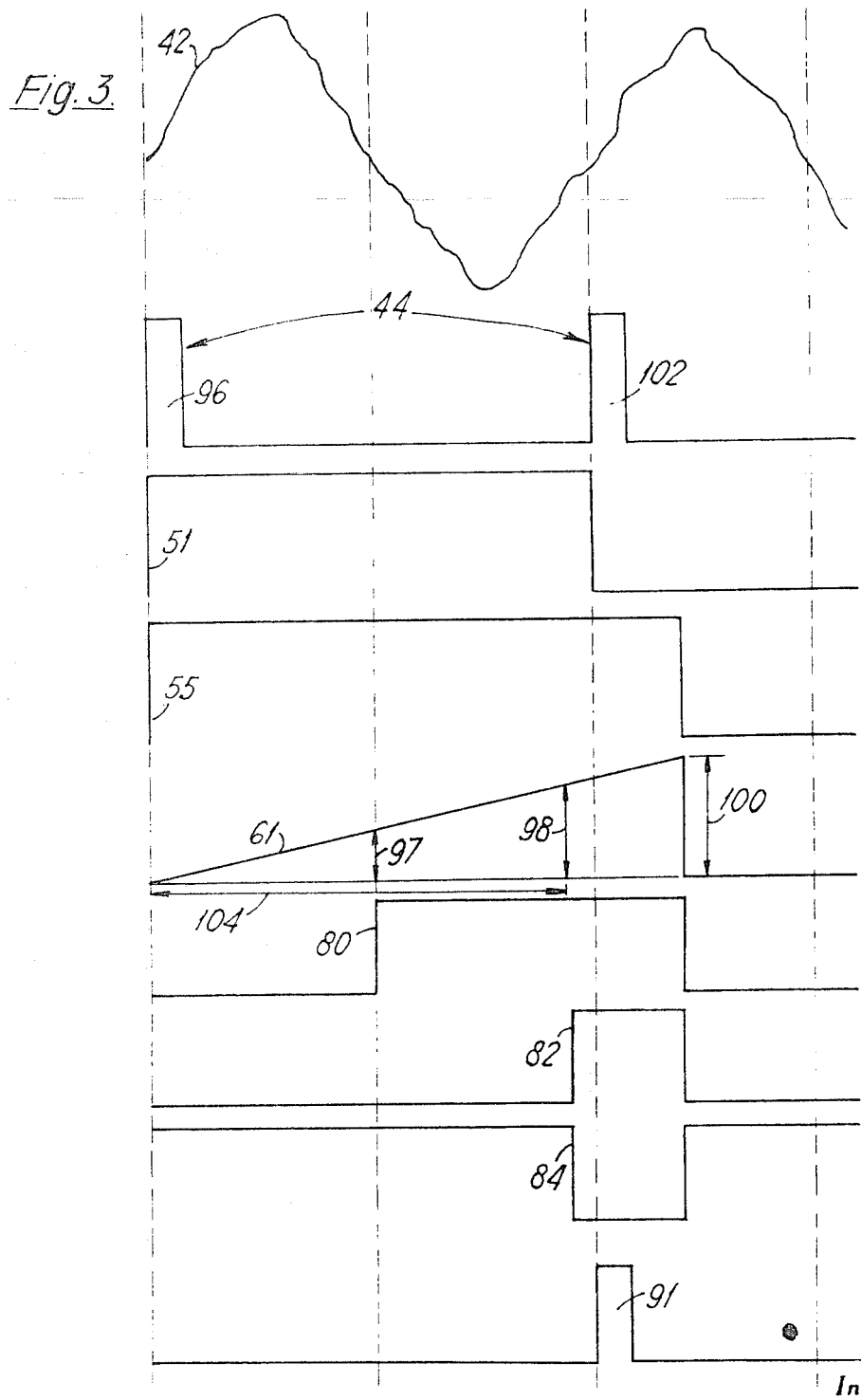
FIG. 3 shows waveforms produced in logic circuitry of FIG. 1.

Referring again to FIG. 1, the amplified difference signal on line 38 is fed to a one-shot multi-vibrator 41 for example of the type 74121 sold by the Texas Instrument Company, the multi-vibrator being arranged to produce a trigger pulse each time the amplified difference signal, the waveform of which is shown at 42, in FIG. 3, passes through a 0.5 volt signal level in an increasing direction. Thus, a train of trigger pulses (44, FIG. 3) is produced on a line 46. The time interval between each pulse of the pulse train 44 is thus equal to the period of individual cycles of the difference signal.

A line 46 conducts the trigger pulses to a clock input of a flip flop logic gate 48 of the type No. 7474 sold by the Texas Instrument Company. It will be seen that the flip flop consists of an AND gate 50 and another gate 52, the gate 50 producing a box pulse (51, FIG. 3), which is fed to a CL input of the gate 52. The gate 52 also receives via a line 53 a reset signal discussed hereafter. The gate 50 causes the gate 52 to produce an output box pulse (55, FIG. 3) on a line 54 starting concurrently with the pulse 51, but the termination of the box pulse 55 is governed by the reset signal on the line 53. The box pulse 55 is fed to a switching transistor 56 which controls an amplifier 58 to produce a ramp voltage signal (61, FIG. 3) on a line 60. It will be noted that the ramp voltage 61 is initiated simultaneously with the start of the box pulse 55. The amplifier 58 is preferably a Texas Instrument Company type 724.

First, second and third sensing means consisting respectively of zener diodes 62, 64, 66 and switching transistors 68, 70, 72 are arranged respectively to sense first, second and third values reached by the ramp voltage signal 61, the zener diodes 62, 64, 66 being respectively arranged to conduct at 3.3 volts, 6.8 volts and 7.2 volts. When these voltages are reached, the transistors 68, 70, 72 respectively conduct. When conductive, the transistor 68 applies a signal to an AND gate 74 of a Texas Instrument Company type 7402 logic device. The gate 74 inverts and squares the signal produced by the transistor 68. Similarly, when the transistor 70 conducts, a signal is applied to a gate 76 of the 7402 logic device. The output of this gate is a squared inversion of the signal from the transistor 70, and this output is again inverted in another AND gate 78, of the 7402 device. When the transistor 72 conducts, it emits the signal on the line 53 which is utilised as the previously mentioned reset signal, which terminates the ramp signal voltage 61 and returns it to its initial value by resetting the flip flop 48 to its initial condition. In FIG. 3, the output of the gate 74 is shown at 80, the output of the gate 76 at 82, and the output of the gate 78 at 84.

The output of the gate 74 is fed to an input of a four-input NAND gate 86 which together with a further similar gate 88 is provided in a Texas Instrument Company type 7420 logic device. The other inputs to the gate 86 are the output of the gate 78, the box pulse 55 on the line 54, and the trigger pulse train 44. The gate 88, also a four-input NAND gate, receives the output of the gate 76, the trigger pulse train 44, and the box pulse 55 on the line 54, the trigger pulse train 44 being applied to two inputs of the gate.

The output of the gate 86 is taken to an amplifying switching transistor 89, and the output of the gate 88 is taken via an inverting gate 90 in the 7402 logic device, to supply a pulse 91 (FIG. 3) to an amplifying switching transistor 92 similar to but oppositely biassed compared to the switching transistor 89, so that when rendered conductive it produces an output of opposite polarity compared to that produced by transistor 89 when it is conductive. Both transistors 89, 92 feed an integrator 93 comprising a Texas Instrument Company type 709 amplifier provided with a feedback loop including a capacitor 94 and a diode in parallel. In operation, an integrated voltage is stored across the capacitor 94. A feedback line 95 conducts this voltage to the amplifier 58 whereby to control in known fashion the rate of change of the ramp voltage signal with time.

In operation, a cycle of the amplified difference signal having a peak amplitude above 0.5 volts triggers the multi-vibrator 40 and produces as part of the trigger pulse train 44, a trigger pulse for example the left-hand pulse 96 in FIG. 3. This pulse initiates simultaneously a single box pulse 51, a single box pulse 55 and a ramp voltage signal 61. The ramp voltage signal increases in magnitude until it reaches a first value (97, FIG. 3) whereupon the squared output 80 of the transistor 68 is provided at the output of the gate 74. When the ramp voltage signal reaches its second value (98, FIG. 3) the squared output 82 is provided at the output of the gate 76. Simultaneously, with the output 80 the gate 78 provides the squared output 84. It will be noted that all three outputs 80, 82, 84 terminate simultaneously, when the ramp voltage signal attains its third value 100.

If the trigger pulse 102 immediately following the first mentioned trigger pulse 96 occurs whilst the ramp voltage signal is between the first and second values 97, 98, then all four inputs to the four-input NAND gate 86 are positive, and the gate therefore conducts for a period equal to the duration of the trigger pulse 102. The amplitude of the output of the gate 86 is independent of the amplitude of the amplified difference signal. The amplifying switching transistor 89 is thus caused to conduct, producing a pulsiform signal of an algebraic sign such that the integrator 93 subtracts it from the voltage stored across the capacitor 94.

When the second value 98 is reached, the output 84 of the gate 78 changes polarity, and therefore prevents an output from the gate 86 from subsequently occurring.

When the trigger pulse 102 occurs whilst the ramp voltage signal is between its second and third values 98, 100 then all four inputs to the gate 88 are positive and the gate is caused to conduct for a time equal to the duration of the pulse 102. The output from the gate 88 is inverted in the gate 90 providing a pulse 91 which is applied to the other switching transistor 92. This conducts and provides a pulsiform signal of algebraic sign opposite to that of the pulsiform signal produced by the transistor 89. Thus, the integrator 93 adds the pulsiform signal to the voltage stored across the capacitor 94.

It will be appreciated that a succession of pulsiform signals from the transistors 89, 92 cause the said voltage to build up across the capacitor 94, and since this voltage is increased or decreased according to the polarity of each pulsiform signal, its value is an indication of the mean period of the selected cycles of the difference signal, and is thus indicative of speed.

The voltage across the capacitor 94 is thus taken to an indicator such as a voltmeter 108 via a line 106.

The value of the voltage across the capacitor 94 controls via the feedback line 95 the rate of change of the ramp voltage signal thereby to adjust the mean period. The diode in parallel with the capacitor 94 across the amplifier 93 is provided to ensure that the line 95 cannot attain a polarity such as to inhibit the sawtooth and catching circuits provided by the amplifier 58 and the Zener diodes 62, 64, 66 and the associated switching transistors and logic.

The time interval 104 (FIG. 3) from the initiation of the ramp signal voltage to the time at which it reaches its second value 98 represents the mean period.

The first value 97 is set to occur at one half this period, and the third value 100 is set to occur at the mean period plus 10 per cent thereof. This allows "half frequency" indication to be ignored, and effects integration about the highest mean frequency present.

The train of box pulses 55 is fed to both gates 86 and 88, since the wave forms 80, 82, and 84 hold the gates 86 and 88 open for different periods, and would otherwise permit false signals to be passed through.

The output voltage on line 106 may be integrated or differentiated with respect to time to produce a quantity related to speed by time such as distance or acceleration.

An active integrator 107 receives and integrates the output voltage on the line 106 to provide an indication of distance.

Figure 6:
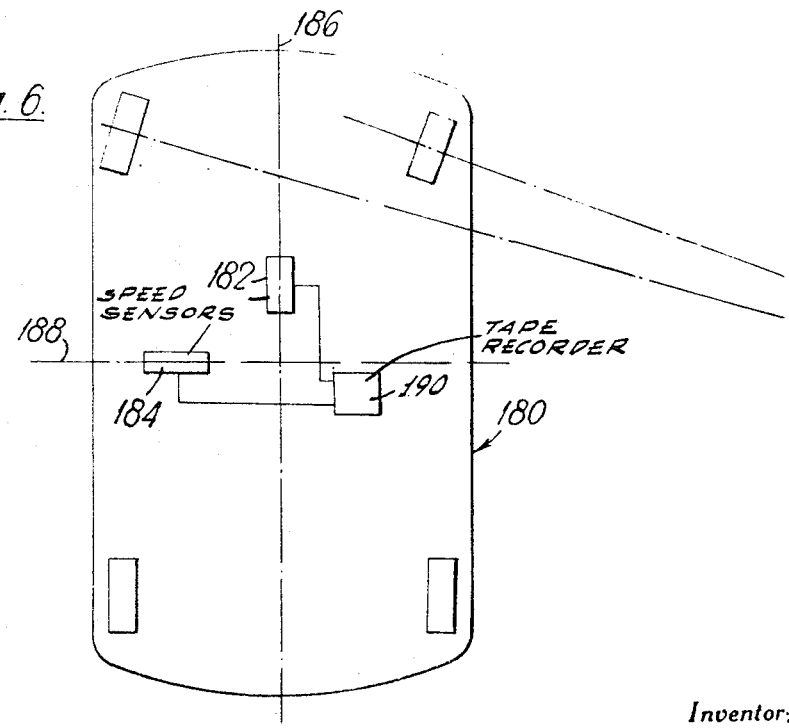
FIG. 6 shows a motor vehicle provided with equipment according to the invention.

Alternatively, or in addition, a differentiating circuit may be provided in order to differentiate with respect to time the output voltage on the line 106, so as to provide an indication of acceleration. Thus, the speed and time-related quantities 'acceleration' and 'distance travelled,' are easily available. The 'acceleration' indication is particularly useful in the application of the invention discussed hereafter with reference to FIG. 6.

Figure 4:
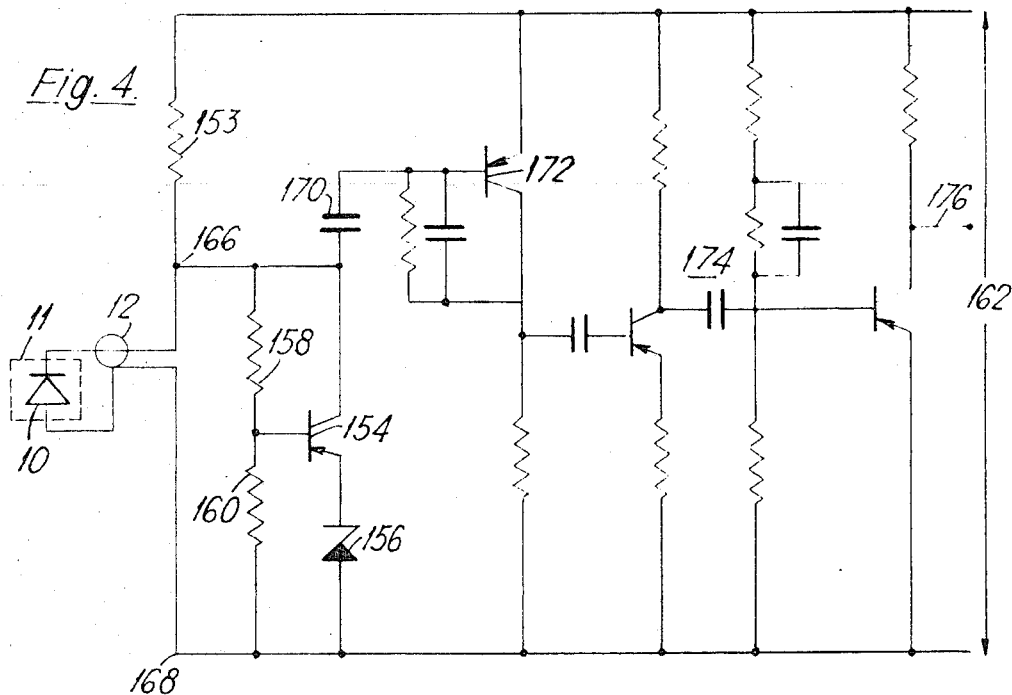
FIG. 4 shows an alternative form of part of the circuitry of FIG. 1.

Referring to FIG. 4, there is shown an alternative voltage stabilising circuit for the Gunn effect device 10. The Gunn diode is again shown at 10, in a resonant cavity 11 and connected to an antenna 12.

In operation, the Gunn diode produces by the Gunn effect a signal for transmission via the antenna 12 as described with reference to FIG. 1. Received reflected signals are mixed with the to-be-transmitted signal in the Gunn diode, and if there is a difference in frequency therebetween, due to a Doppler shift, an A.C. difference signal having a frequency equal to the difference frequency is developed across an output load resistor 153.

The voltage stabilising circuit comprises a transistor 154, a Zener diode 156, and a pair of resistors 158, 160. The stabilising circuit is connected across a voltage source 162 via the output load resistor 153. From FIG. 4 it will be seen that the transistor 154 has its emitter-collector path in series with the Zener diode across the Gunn diode 10, the base of the transistor being biassed by the resistors 158, 160 which constitute a potential divider and which also are connected across the Gunn diode. In operation, changes in the difference signal level produced by the Gunn diode and developed across the resistor 153 would, in the absence of the voltage stabilising network produce a change in the voltage between points 166, 168 which voltage constitutes the drive voltage for the Gunn diode. However, the Zener diode 156 provides a stabilised emitter voltage for the transistor 154, and the feedback afforded by the resistors 158, 160 ensure that the drive voltage between the points 166 and 168 remains substantially constant regardless of the output voltage across the resistor 153.

The A.C. difference signal across the resistor 153 is taken via a D.C.-blocking capacitor 170 to a transistor 172 which constitutes the first stage of an amplifier indicated generally at 174. The amplified difference signal from the amplifier 174 is taken via a line 176 (corresponding to the line 38 of FIG. 1) to the one-shot multi-vibrator 41.

In either the circuit of FIG. 1 or FIG. 4, instead of a Gunn effect device 10, there may instead be utilised a different type of semiconductive device capable of operating as a self-oscillating mixer. For example, a so-called IMPATT device may be employed. An IMPATT device is an Impact Ionisation Avalanche Transit Time diode. With certain such semiconductive devices, a voltage stabilising circuit need not be provided.

Referring to FIG. 5, there is shown an application of the speed sensor in a velocity measuring system particularly suitable for use in an air cushion vehicle 109 which is shown in a plan view.

Two speed sensors 110, 112 as previously described, are disposed in fixed relation to each other in the air cushion vehicle 109 and are arranged to sense speed in two orthogonal directions 114, 116, in the yaw plane, of the air cushion vehicle, each axis 114, 116 making an angle of 45° with the roll axis 118 of the craft. Other angles (e.g. 30°) may be employed, but 45° is the most suitable for the embodiment described and illustrated. The pitch axis of the craft is shown at 120, and is orthogonal to the roll axis 118.

The outputs of the speed sensors 110, 112 are fed via their respective lines 106 to respective precision modulators (not shown) which produce from the D.C. voltages on the lines 106 respective A.C. signals having the same phase and frequency. These A.C. signals are fed to the respective stator coils of a conventional resolver 122, (e.g. of the 08 type). The resolver of course resolves input signals to its stator coils along two orthogonal axes, the directions of which are dependent upon the angular position of the rotor of the resolver. A servo motor 123 is arranged to rotate the rotor of the resolver until the resolved output on one axis of resolution is zero. The output on the other axis of resolution is then equal to the magnitude of the velocity of the hovercraft, and is taken via a line 124 to a suitably calibrated 270° aircraft millimeter 125 for display. The servo motor 123 takes a feedback signal from the line 124. The direction of the velocity is perpendicular to the axis of resolution upon which the output is zero. The angular position of the rotor of the resolver is indicated by an indicator 126 comprising a pointer attached to the rotor, and a fixed suitably calibrated scale to indicate the direction of motion of the air cushion vehicle relative to its roll axis 118. It will be appreciated that the motion of an air cushion vehicle often involves a component of drift and thus the angle made by the direction of the motion to the roll axis 118 is usually known as the drift angle. A suitable indication of the drift angle also is provided by the indicator 126.

An indication of distance travelled by the air cushion vehicle is provided by means of an active integrator 128 arranged to integrate the velocity indication on line 124, and to provide suitable indication on a meter 130. An indication of the angular position of the rotor of the resolver 122 is taken by means of a synchro transformer 134 to correct a steering compass 136 so that the indicated heading of the air cushion vehicle is adjusted to allow for the drift angle.

Another application of the invention is in the testing of motor vehicles, e.g. under conditions of limiting tyre adhesion.

A conventional method of such testing involves driving the vehicle as fast as possible around a curve of known constant radius and noting the indicated speed at which tyre adhesion is lost. Whilst this gives some information it gives little indication of the precise motion of the vehicle as adhesion is lost. Therefore, in FIG. 6 there is shown the application of the invention to a motor vehicle.

A motor vehicle 180 (shown in plan) is provided with first and second speed sensors 182, 184 as described with reference to FIGS. 1 and 2, or 4. The sensor 182 senses the vehicle's speed along its longitudinal axis 186 and the sensor 184 senses the vehicle's speed along its lateral or transverse axis 188. Preferably, the sensors are provided with acceleration-indicating circuits (not shown but described previously). The signals indicating speed and acceleration are recorded in suitable equipment such as a multi-channel tape recorder 190, together with other useful information regarding the vehicle stability and performance, e.g. its angle of roll, the angle of the front wheels to the axis 186. Thus, a record of the vehicle's performance can be obtained.

I claim:

1. Radar apparatus for measuring a Doppler shift between the frequencies of a transmitted radar signal and a reflected radar signal, comprising means to provide a difference signal, means to select those cycles of the difference signal that have an amplitude above a predetermined limit and a period within predetermined limits of a mean period derived from the periods of previously selected cycles, means to provide pulsiform signals, each pulsiform signal corresponding to a resepective selected cycle and having an algebraic sign depedent on the period of said respective cycle compared to said mean period, and means for integrating the pulsiform signals for providing a signal proportional to the Doppler shift 2. Apparatus as claimed in claim 1 wherein the means to select comprises a trigger operative each time the amplitude of the difference signal passes in a predetermined direction through a predetermined value to provide a train of trigger pulses, means to initiate a ramp signal in response to a said trigger pulse, means respectively to sense when the ramp signal reaches first, second and third values, gating means to receive signals from the sensing means, and to receive the trigger pulses, the gating means producing a said pulsiform signal of one algebraic sign if the trigger pulse immediately following the aforementioned trigger pulse occurs while the ramp signal is between its first and second values, the gating means producing a pulsiform signal of the other algebraic sign if the said immediatedly following trigger pulse occurs while the ramp signal is between its second and third values.

3. Apparatus as claimed in claim 2 wherein the integrating means comprises means to provide a stored quantity, indicative of the Doppler shift and being the integral of previously-occuring pulsiform signals, and means to adjust said stored quantity according to the algebraic sign of each pulsiform signal, a feedback loop controlling the rate of change with time of the ramp signal as a function of said stored quantity.

4. Apparatus as claimed in claim 3 comprising a logic gate, the sensing means operating when the ramp signal reaches its third value to terminate said ramp signal and to set the logic gate to a predetermined state, the logic gate changing state in response to a subsequently occuring trigger pulse to re-initiate said ramp signal.

5. Apparatus as claimed in claim 1, comprising a microwave semiconductive device arranged to operate as an oscillator to provide the transmitted radar signal, and as a mixer to mix the transmitted radar signal and the reflected radar signal, for developing said difference signal.

6. Apparatus as claimed in claim 5 further comprising a cavity resonator, said device being a Gunn effect device disposed in said cavity resonator, a voltage stabilizing circuit being arranged to drive said Gunn effect device.

7. Apparatus as claimed in claim 6 wherein the voltage stabilizing circuit includes a Zener diode for providing a reference voltage, means to compare a drive voltage applied to the Gunn effect device with the reference voltage and means to stabilize the drive voltage according to said comparison.

8. Apparatus as claimed in claim 7 wherein the means for stabilizing and comparing the drive voltage comprises a transistor having its emitter-collector path in series with the Zener diode across the Gunn effect device, the base of the transistor being biassed by a potential divider also connected across the Gunn effect device.

9. Apparatus as claimed in claim 7 wherein the means for stabilizing and comparing the drive voltage comprises a transistor pair adapted to compare the said drive voltage with the reference voltage and to control the drive voltage by means of a further transistor.

10. Apparatus as claimed in claim 1 comprising means to derive from the integrator output an indication of speed.

11. Apparatus as claimed in claim 10 comprising an active integrator to integrate the integrator output to provide an indication of distance.

12. A measuring system comprising two radar apparatuses fixed relative to each other, one for sensing speed in one direction and the other for sensing speed in a direction orthogonal to the said one direction, each radar apparatus comprising means to transmit a radar signal and to receive a reflected said radar signal, each apparatus including means to provide a difference signal, means to select those cycles of the difference signal that have an amplitude above a predetermined limit and a period within predetermined limits of a mean period derived from the periods of previously selected cycles, means to provide pulsiform signals, each pulsiform signal corresponding to a respective selected cycle and having an algebraic sign dependent on the period of said respective cycle compared to said mean period, and means to integrate the pulsiform signals for providing a signal proportional to the Doppler shift, each apparatus having means for utilizing its integrator output as an indication of said speed.

13. A system as claimed in claim 12 comprising means to compute from the indications provided by each said apparatus the magnitude and direction of a velocity vector whose components are the said indications.

14. A system as claimed in claim 13 comprising a resolver having orthogonal axes of resolution, a rotor, and two stator coils, means to derive respective A.C. signals from said indications of speed, means to apply said A.C. signals to the two stator coils of the resolver, means to rotate the rotor of the resolver and to utilize the angular position thereof as an indication of the direction of said vector when the resolved output on the other axis of resolution is zero, and means to utilize the resolved output on the other axis of resolution as an indication of the magnitude of said vector in said direction.

15. A system as claimed in claim 14 comprising an active integrator arranged to integrate the said indication of the magnitude of the said velocity to provide an indication of distance.

16. A system as claimed in claim 14 comprising means to utilise the said angular position of the rotor to correct a steering compass.

17. Apparatus as claimed in claim 1 comprising means to derive from the integrator output an indication of a quantity related to speed by time.

18. A measuring system comprising two radar apparatuses fixed relative to each other, one for sensing a quantity related to speed by time in one direction and the other for sensing a quantity related to speed by time in a direction orthogonal to said one direction, each radar apparatus comprising means to transmit a radar signal and to receive a reflected said radar signal, each apparatus including means to provide a difference signal, means to select those cycles of the difference signal that have an amplitude above a predetermined limit and a period within predetermined limits of a mean period derived from the periods of previously selected cycles, means to provide pulsiform signals, each pulsiform signal corresponding to a respective selected cycle and having an algebraic sign dependent on the period of said respective cycle compared to said mean period, and means to integrate the pulsiform signals for providing a signal proportional to the Doppler shift, each apparatus having means for utilizing its integrator output as an indication of said quantity related to speed by time.

19. A system as claimed in claim 18 comprising means to compute from the indications provided for each said apparatus the magnitude and direction of a velocity and time-related vector whose components are the said indications.

20. A system as claimed in claim 19 comprising a resolver having orthogonal axes of resolution, a rotor, and two stator coils, means to derive respective A.C. signals from said indications of speed, means to apply said A.C. signals to the two stater coils of the resolver, means to rotate the rotor of the resolver and to utilize the angular position thereof as an indication of the direction of said vector when the resolved output on the other axis of resolution is zero, and means to utilise the resolved output on the other axis of resolution as an indication of the magnitude of said vector in said direction.

21. In combination with an air cushion vehicle, a measuring system comprising two radar apparatuses fixed relative to each other, one for sensing speed in one direction and the other for sensing speed in a direction orthogonal to the said one direction, each radar apparatus comprising means to transmit radard signal and to receve a reflected said radar signal, each apparatus including means to provide a difference signal, means to select those cycles of the difference signal that have an amplitude above a predetermined limit and a period within predetermined limits of a mean period derived from the periods of previously selected cycles, means to provide pulsiform signals, each pulsiform signal corresponding to a respective selected cycle and having an algebraic sign dependent on the period of said respective cycle compared to said mean period, and means to integrate the pulsiform signals for providing a signal proportional to the Doppler shaft, each apparatus having means for utilizing its integrator output as an indication of said speed, said measuring system being located in said vehicle and said directions being in the yaw plane of the vehicle.

22. In combination with a road vehicle, a measuring system comprising two radar apparatuses fixed relative to each other, one for sensing speed in one direction and the other for sensing speed in a direction orthogonal to the said one direction, each radar apparatus comprising means to transmit a radar signal and to receive a reflected said radar signal, each apparatus including means to provide a difference signal, means to select those cycles of the difference signal that have an amplitude above a predetermined limit and a period within predetermined limits of a mean period dervied from the periods of previously selected cycles, means to provide pulsiform signals, each pulsiform signal corresponding to a respective selected cycle and having an algebraic sign dependent on the period of said respective cycle compared to said mean period, and means to integrate the pulsiform signals for providing a signal proportional to the Doppler shift, each apparatus having means for utilizing its integrator output as an indication of said speed, said measuring system being affixed to said vehicle and said directions being in the longitudinal and transverse directions of said vehicle.

* * * * *